J. A. EMENHISER.
HAY RAKE AND SIDE LOADER.
APPLICATION FILED JAN. 3, 1913.
1,077,821.
Patented Nov. 4, 1913.
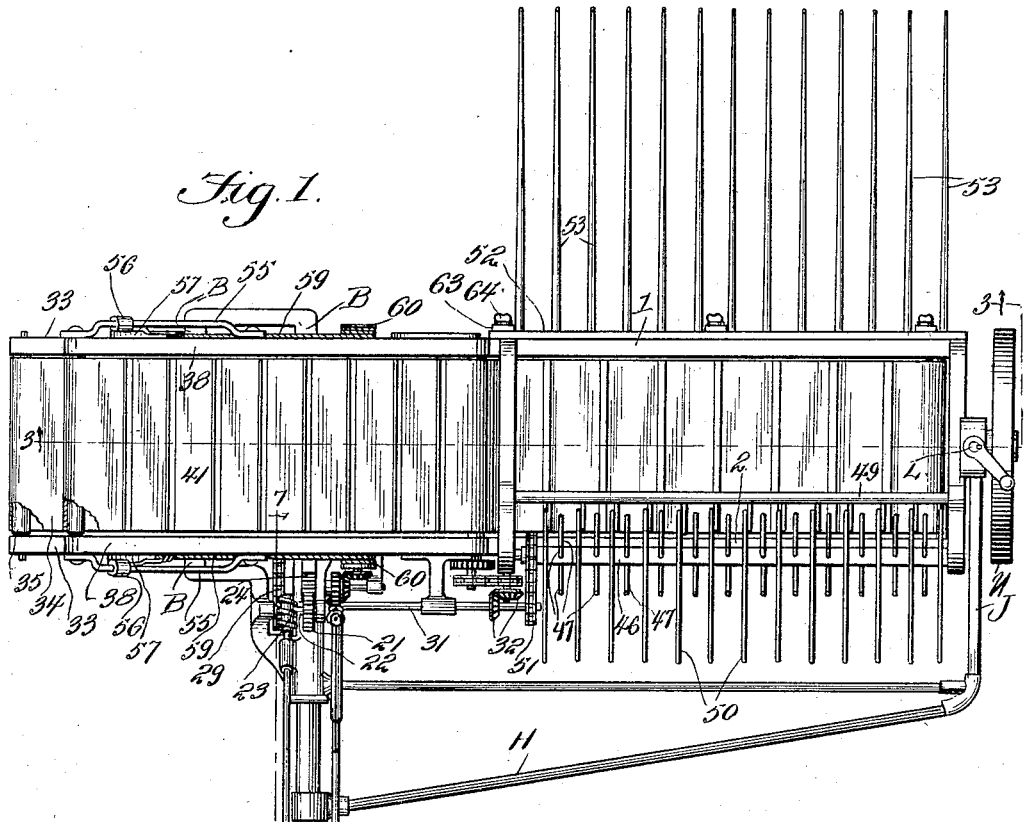

J. A. EMENHISER.
HAY RAKE AND SIDE LOADER.
APPLICATION FILED JAN. 3, 1913.
1,077,821.
Patented Nov. 4, 1913.
3 SHEETS—SHEET 2.
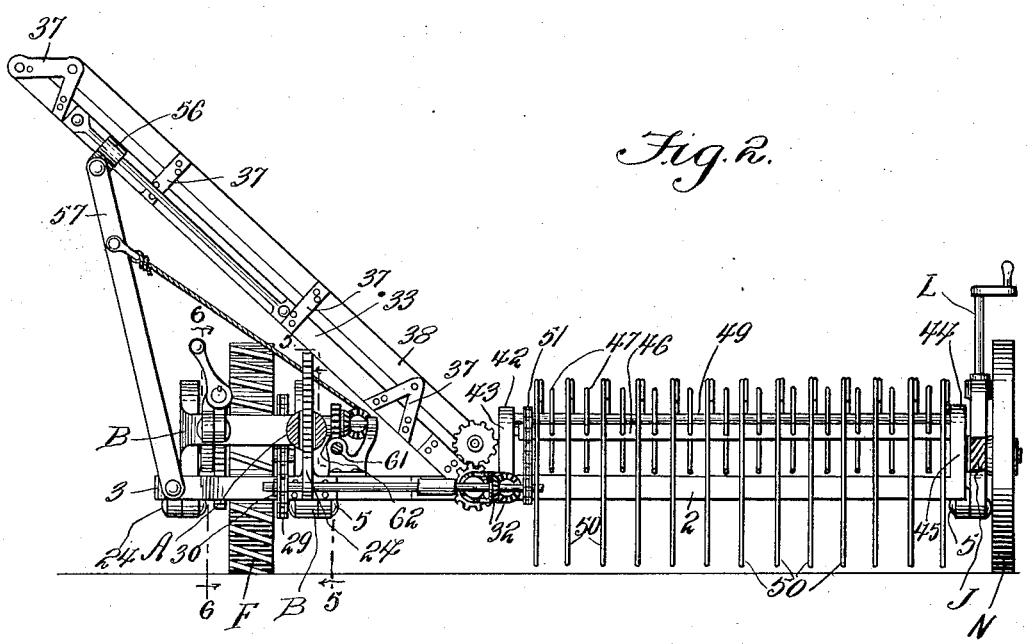
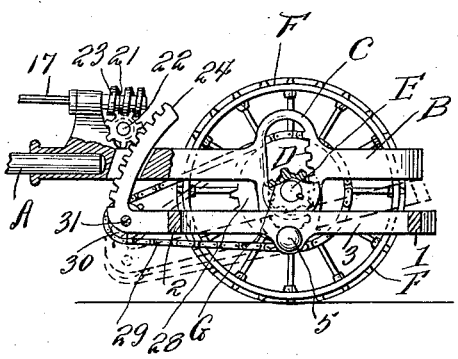
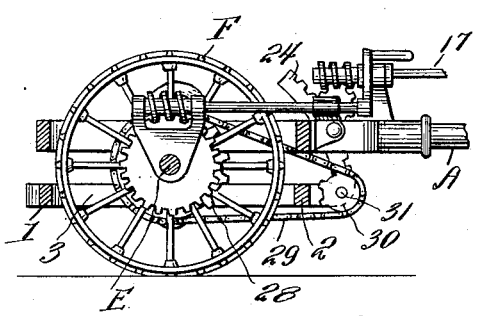
Inventor
Jerome A. Emenhiser,
By Victor J. Evans,
Attorney
Witnesses J. A. EMENHISER.
HAY RAKE AND SIDE LOADER.
APPLICATION FILED JAN. 3, 1913.
1,077,821.
Patented Nov. 4, 1913.
3 SHEETS—SHEET 3.
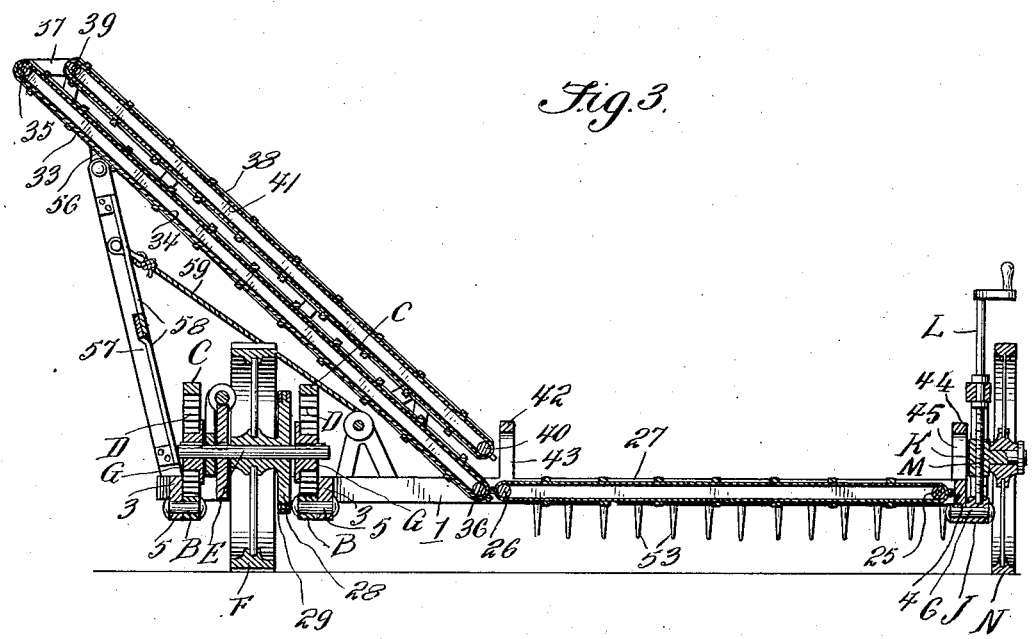
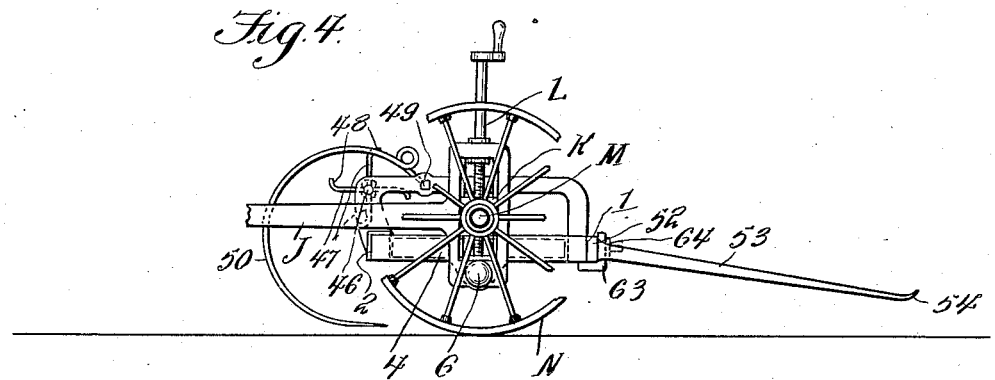
Witnesses
Inventor
Jerome A. Emenhiser
By Victor J. Evans
Attorney

UNITED STATES PATENT OFFICE.

JEROME A. EMENHISER, OF ANADARKO, OKLAHOMA.

HAY-RAKE AND SIDE LOADER.

1,077,821.   Specification of Letters Patent.   Patented Nov. 4, 1913.

Application filed January 3, 1913. Serial No. 740,046.

*To all whom it may concern:*

Be it known that I, JEROME A. EMENHISER, a citizen of the United States, residing at Anadarko, in the county of Caddo and State of Oklahoma, have invented new and useful Improvements in Hay-Rakes and Side Loaders, of which the following is a specification.

This invention relates to hay rakes and loaders, and it has for its object to produce a machine of simple and efficient construction whereby hay may be gathered in the field and loaded on to a wagon driven alongside the machine, and whereby it may be transported to a stacking place, barn or other place of deposit.

One object of the invention is to produce a simple and efficient organized machine, whereby the hay may be conveniently gathered and loaded, whether it has simply been cut by the mower so as to lie in swaths, or whether the hay has previously been raked into windrows.

A further object of the invention is to produce a machine of the class described having a set of gathering teeth detachably connected therewith which may be used in gathering hay from windrows, but which may be detached when the machine is to be used for gathering loose hay.

With these and other ends in view which will readily appear as the nature of the invention is better understood, the same consists in the improved construction and novel arrangement and combination of parts which will be hereinafter more fully described.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a machine constructed in accordance with the invention. Fig. 2 is a rear elevation, partly in section. Fig. 3 is a transverse sectional view taken on the line 3—3 in Fig. 1. Fig. 4 is a side elevation, parts of the near wheel having been broken away. Fig. 5 is a sectional detail view taken on the line 5—5 in Fig. 2. Fig. 6 is a sectional view taken on the line 6—6 in Fig. 2. Fig. 7 is a sectional detail view taken on the line 7—7 in Fig. 1.

Corresponding parts in the several figures are denoted by like characters of reference.

The main frame of the machine comprises a push tongue A which is bifurcated at its front end to produce the prongs or arms B having heads provided with arcuate slots C having toothed front walls D. The main axle E carrying the bull wheel F is provided with pinions G meshing with the rack teeth D so that by rotation of the pinions the heads of the push tongue will be raised or lowered. A brace H connected with and extending forwardly and obliquely from the push tongue supports a frame J wherein a slide or follower K is vertically adjustable by a hand screw L. The slide K carries a spindle M on which a ground wheel N is mounted for rotation.

The main frame which, by rotating the pinions G and the screw L, may be raised or lowered with respect to the ground, supports a tiltable frame structure which, like the main frame, may be constructed of wood, metal tubing, angle iron or steel, or any other suitable material or combination of materials. Said tilting frame includes the front and rear bars 1, 2 and side members 3, 4 which latter are connected by pivot members 5, 6 with one of the arms B of the bifurcated push tongue and with the frame J, respectively. The push tongue A is provided adjacent to its rear end with the customary supporting means in the nature of a caster wheel 12, as well as with the draft attachment or evener 13, platform 14 and seat 15 for the driver or operator. The push tongue is also provided a suitable distance in front of the seat with an upright 16 affording bearings for the rear ends of two shafts 17 and 18 having hand wheels 19, 20, whereby they may be rotated. The forward end of the shaft 17 is connected by worm gearing 23 with a suitably supported shaft 22 carrying a gear 21 meshing with a rack bar 24 that projects upwardly from the rear cross bar 2 of the tilting frame, and whereby said frame may be tilted and supported in adjusted position. The function of the shaft 18 will be presently described.

The front and rear cross bars of the tilting frame are provided with bearings for the journals of a pair of rollers 25, 26 over which is guided an endless conveyer 27 constituting a movable platform. Associated with the bull wheel F is a bull sprocket 28 which is connected by a chain or link belt 29 with a sprocket wheel 30 on a shaft 31 supported in suitable bearings on the rear frame bar 2, and from the shaft 31 motion is transmitted to the roller 26 by gearing 32, thus driving the movable platform.

Pivotally connected with the front and rear frame bars 1 and 2 are the side bars 33 of a frame supporting an endless conveyer 34, said conveyer being guided over rollers 35, 36 adjacent to the upper and lower ends of the side bars 33. The said side bars 33 are provided with brackets 37 supporting the side bars 38 of a second conveyer frame, said side bars supporting adjacent to their upper and lower ends rollers 39, 40 over which a second conveyer 41 is guided. Motion in the proper direction is transmitted from the gear 32 to the lower roller 36 over which the conveyer 34 is guided, and the rollers 36 and 40 may be provided with intermeshing gears for the transmission of motion, so that the top conveyer 41 will likewise be driven in the proper direction. The several conveyers including that which constitutes the movable platform may be made in any suitable well known manner of textile or other flexible material provided with transverse slats riveted or otherwise secured thereon. It will be understood that the top conveyer 41 is suitably spaced above the conveyer 34 to permit the hay to be elevated by and between the proximate leads of said conveyers. The front and rear frame bars 1 and 2 are connected adjacent to the lower end of the elevating conveyers by means of a brace 42 having bracket members 43, whereby said brace is suitably elevated so as not to interfere with the passage of the hay from the movable platform to the elevating conveyers. A similar brace 44 having supporting brackets 45 is mounted upon or adjacent to the side bar 4 of the frame.

Supported for rotation on the braces 42, 44 above the rear frame bar 2 is a shaft 46 having a plurality of sets of radiating arms 47 constituting feeders, said arms at the upgoing side being slightly curved in an upward direction, as shown at 48. The braces 42, 44 also support a rake head 49 with which is suitably connected a plurality of curved rake teeth 50 of ordinary construction, said rake teeth extending above the feeder shaft and downwardly in rear of the feeders and in rear of the movable platform, being thence curved downwardly and forwardly to present the customary and conventional form of rake teeth. The feeder shaft may receive motion by means of a chain 51 from the shaft 31, which latter is directly driven from the bull wheel, as previously described.

Mounted detachably upon the front bar 1 of the frame is a bar 52 having a plurality of forwardly and downwardly extending gathering teeth 53, the forward extremities of which are slightly curved in an upward direction to present shoes 54 that engage and are supported on the ground without danger of digging into the ground when the machine advances.

Each side member 33 of the frame supporting the conveyer 34 is provided with a rod 55, suitably connected therewith and spaced therefrom, and said rod carries a movable sleeve 56 associated with an upright 57 which is pivotally connected with the frame of the machine. The upright 57 may be reinforced by diagonal braces 58. The prop, formed by the uprights 57 and braces 58, is connected by means of a flexible element, such as a rope 59, with a winding drum 60 which is suitably supported on the frame of the machine and which may be actuated by the shaft 18 by intermediate gearing preferably including a worm 61 and a worm gear 62, so that the drum may not only be rotated, but also held securely at various adjustments. It is evident that by rotating the drum 60 to wind or unwind the flexible element, the angle of the uprights 57 may be changed, thereby raising or lowering the free end of the frame supporting the conveyer 34 so as to cause material to be discharged at the most suitable point with respect to a wagon or hay rack that is driven alongside the machine when in operation. The head bar 52 having the gathering teeth 53 may be supported detachably in keepers 63 on the front bar 1 of the frame, and set screws 64 or other suitable fastening means may be employed for the purpose of holding the said bar in position in such fashion that it may be readily detached when desired.

In the operation of this machine, when loose hay is to be gathered, the bar 52 having the teeth 53 is detached. When the machine is pushed over the field, the hay will be gathered by the rake teeth 50; as it accumulates in front of the latter, it will be taken by the feeders 47 and thrown forwardly on the movable platform formed by the conveyer 27, being carried thereby in the direction of the lower ends of the two conveyers 34 and 41, whereby it is elevated and discharged. If hay is to be gathered that has been previously raked into windrows, the gathering teeth 53 are brought into use. The hay, as the machine advances, will slide upwardly over said teeth and on to the movable platform, being thereby carried to the elevating conveyers, as before. When the gathering teeth 53 are used in connection with the rake teeth 50, the latter will serve to gather any loose hay that may be left by the teeth 53, thereby avoiding waste.

The improved machine is simple in construction and may be manufactured and marketed at a moderate expense, and by the use thereof the labor of gathering the hay crop may be performed quickly and with much less manual labor than heretofore, thereby avoiding danger of the hay being spoiled by inclement weather and effecting a great saving in the labor of gathering the crop.

Having thus described the invention, what is claimed as new, is:—

1. In a machine of the character described, a tiltable frame carried thereby, elevated braces having brackets connected with and supported by the tiltable frame, conveying and elevating means supported by the tiltable frame and including a movable platform, a rake head supported on the elevated braces, rake teeth carried by said head, a shaft supported for rotation on the elevated braces in rear of the rake head and having radially extending arms constituting feeders, said feeders being positioned between the rake teeth and the movable platform, means for driving the feeder shaft, and a bar mounted on the front bar of the tiltable frame and having forwardly extending gathering teeth.

2. In a machine of the character described, a main frame, rotary supporting means for said frame including a bull wheel and a ground wheel, a tiltable frame supported on the main frame, elevated braces having bracket members supported on the tiltable frame, conveying and elevating means including an endless conveyer constituting a movable platform on the tiltable frame, a rake head and a feeder shaft supported on the elevated braces, said rake head having teeth curved rearwardly and downwardly in rear of the feeder shaft, and downwardly and forwardly beneath the movable platform, means for transmitting motion from the bull wheel to the feeder shaft, means for transmitting motion from the bull wheel to the conveying and feeding means, a cross bar supported detachably on the front bar of the frame, and gathering teeth connected with and extending forwardly from said bar.

3. In a machine for making and loading hay, a tiltable main frame, a tiltable auxiliary frame carried thereby, conveying and elevating means coacting with the tiltable frame and including a movable platform, a rake and a rotary feeding device for gathering loose hay and depositing the same on the movable platform at the rear thereof, and gathering teeth detachably connected to the front part of the frame for gathering hay and depositing the same on the movable platform at the front part thereof.

In testimony whereof I affix my signature in presence of two witnesses.

JEROME A. EMENHISER.

Witnesses:
　THEO. G. OELKE,
　OSCAR DIEHR.